A. C. DEWEESE.
STREET SWEEPER.
APPLICATION FILED APR. 2, 1920.

1,417,231.

Patented May 23, 1922.
6 SHEETS—SHEET 5.

A. C. Deweese, Inventor

Witness

By Attorneys

A. C. DEWEESE.
STREET SWEEPER.
APPLICATION FILED APR. 2, 1920.

1,417,231.
Patented May 23, 1922.
6 SHEETS—SHEET 6.

A. C. Deweese, Inventor

Witness

By C. A. Snow & Co.
Attorneys

UNITED STATES PATENT OFFICE.

ALBERT C. DEWEESE, OF CHICAGO, ILLINOIS.

STREET SWEEPER.

1,417,231.　　　Specification of Letters Patent.　　Patented May 23, 1922.

Application filed April 2, 1920. Serial No. 370,782.

*To all whom it may concern:*

Be it known that I, ALBERT C. DEWEESE, a citizen of the United States, residing at Chicago, in the county of Cook and State of Illinois, have invented a new and useful Street Sweeper, of which the following is a specification.

The device forming the subject matter of this application is a street sweeper and the invention aims to provide a sweeper which will be peculiarly efficient in removing loose material from the surface of a street, even though the street be rough and uneven.

Another object of the invention is to provide novel means for caring for and preventing the spreading of dust resulting from the sweeping operation.

A further object of the invention is to provide novel means for caring for the sweepings which are loosened by the brushes.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
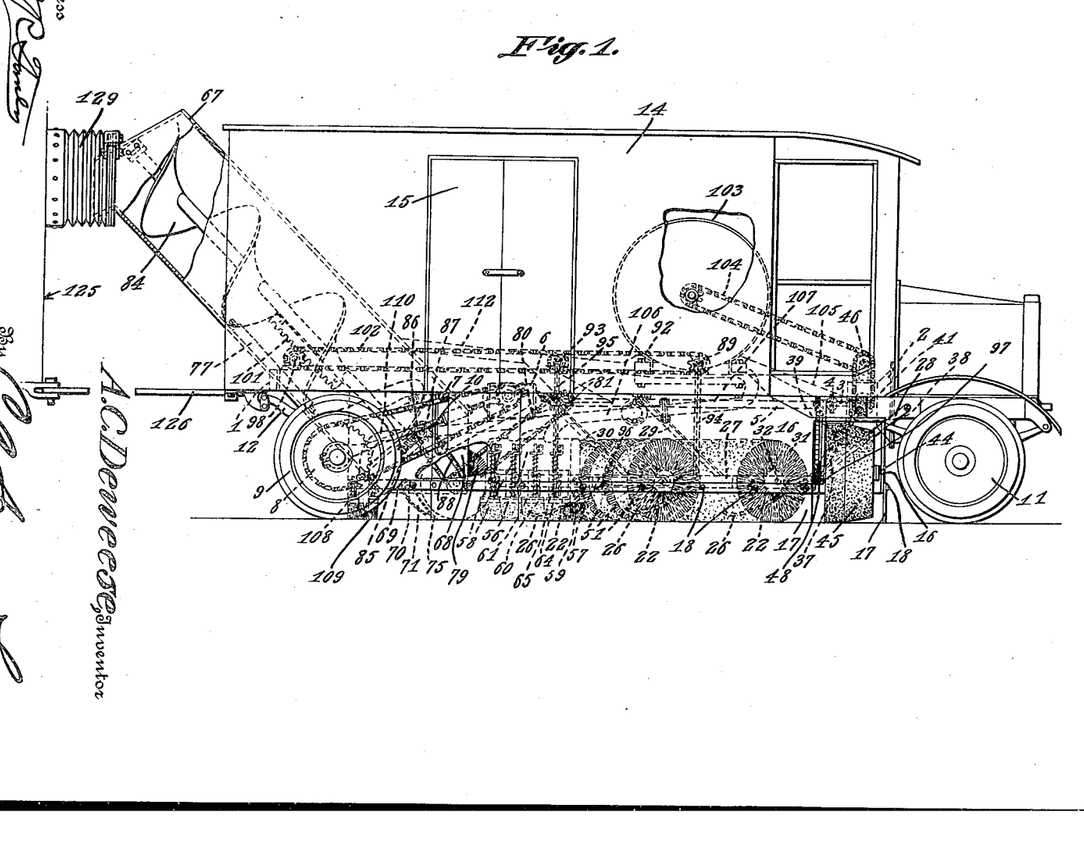
Figure 1 shows in side elevation, a device constructed in accordance with the invention, parts being broken away.
Figure 2:
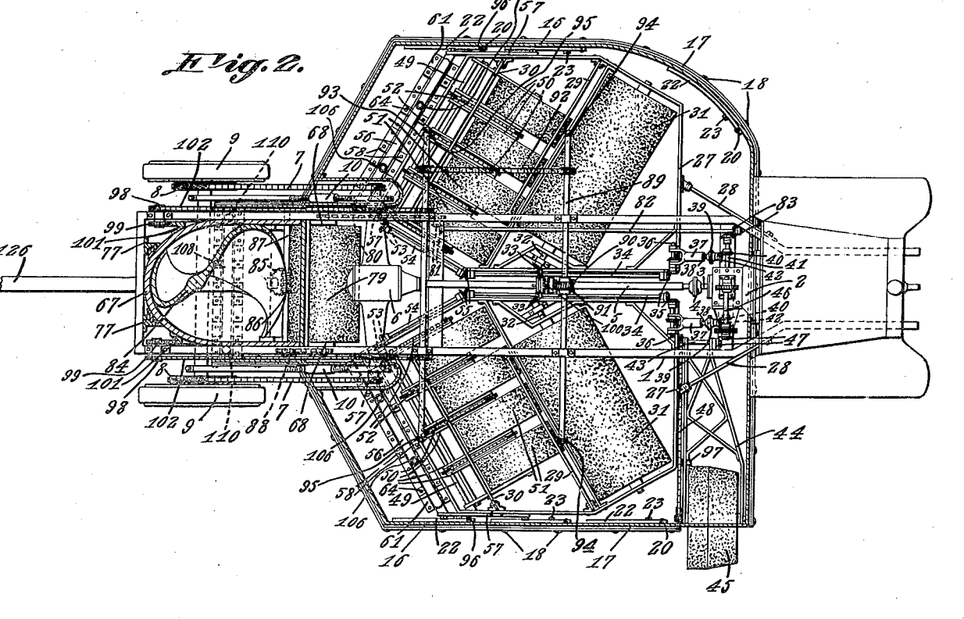
Figure 2 is a top plan wherein parts are removed.
Figure 3:
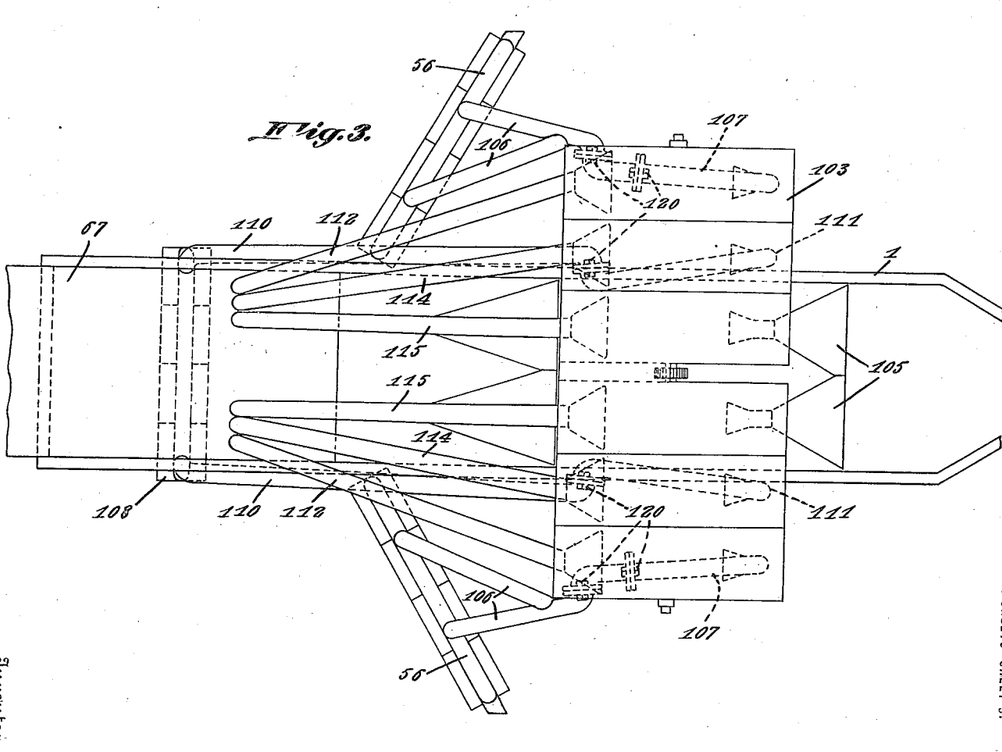
Figure 3 is a diagram showing the general layout of the machine.
Figure 10:
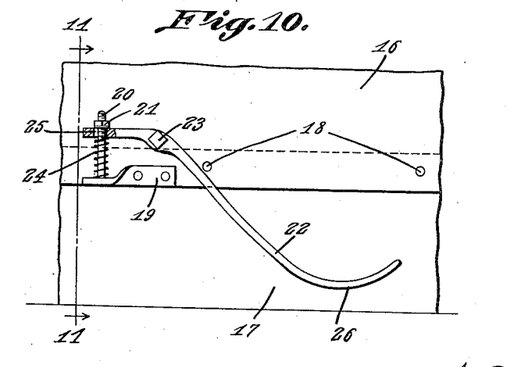
Figure 10 is a fragmental elevation showing a part of the housing, the curtain and attendant parts.
Figure 11:
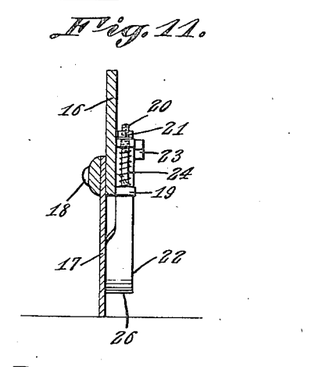
Figure 11 is a section on the line 11—11 of Figure 10.

The device forming the subject matter of this application includes a vehicle in the general form of an automobile, comprising a main frame 1 provided with forward ground wheels 11. The engine appears at 2, the shaft 3 thereof being supplied with a universal joint 4, and operating in the usual tube 5 forming a part of a differential casing 6 mounted on the frame 1. The differential shaft is connected by drive chains 7 with sprocket wheels 8 mounted to move with the rear wheels 9 of the vehicle. The rear axle housing is connected by springs 12 with the frame 1 and is connected to the end portions of the differential casing 6 by longitudinally adjustable turn buckle braces 10. The main frame 1 carries a body 14, access to which is had through doors 15. The main frame 1 supports a housing 16, preferably made of sheet metal, and extended laterally beyond the sides of the frame, as shown in Figure 2. To the lower edge of the housing 16, a depending curtain 17, made of canvas, leather or the like is attached, as indicated at 18, reference being had particularly to Figures 10 and 11. Brackets 19 are mounted on the housing 16 near to the lower edge thereof and carry upstanding studs 20 provided at their upper ends with adjusting nuts 21. Arms 22 are pivoted intermediate their ends, as shown at 23, on the housing 16, the arms being provided at their upper ends with openings 25, through which the studs 20 pass, compression springs 24 being interposed between the brackets 19 and the ends of the arms 22. The arms 22 extend downwardly upon the curtain 17, as clearly shown in Figure 10, and serves to prevent the curtain from flapping about. If an obstacle of any kind should be encountered, the lower ends 26 of the arms 22 will rise, the arms tilting on their pivotal mountings 23, and the springs 24 being put under compression. When the obstruction has passed, the springs 24 will restore the arms to the positions depicted in Figure 10. The ends 26 of the arms preferably are downwardly concaved and upwardly extended at their extremities so as to pass over any obstacles which may be encountered during the sweeping operation, as aforesaid. It may be stated at this point that practically all of the working parts of the machine are enclosed within the housing 16 and its curtain 17. Consequently, but little or any of the dust raised in the sweeping operation, will find its way into the atmosphere.

The numeral 27 denotes an auxiliary frame located within the housing 16 and suspended for swinging movement from the main frame 1 by forward links 28 and side links 29 and 30. Forward brushes 31 are journaled for rotation in the auxiliary frame 27, the axes of the brushes 31 being inwardly and rearwardly inclined toward the longitudinal center of the vehicle, as clearly disclosed in Figure 2 of the drawings. The shafts 32 of the forward brushes 31 are connected by beveled pinions 33 with shafts 34 extended longitudinally of the vehicle and supported on the auxiliary frame 27, the forward ends of the shafts 34 being connected by beveled pinions 35 with transverse shafts 36 supported for rotation on the forward portion of the auxiliary frame 27. Yokes 37 are mounted to swing vertically on the shafts 36. Shafts 38 are journaled in the yokes 37 and include universal joints 39. Beveled pinions 42 connect the rear ends of the shafts 38 with the transverse shafts 36. Beveled pinions 40 connect the forward ends of the shafts 38 with transverse shafts 41 driven by and constituting a part of the engine 2. The construction is such that the brushes 31 will be rotated forwardly, that is, in a counter clockwise direction, so as to sweep the dirt toward the longitudinal center of the vehicle, this disposition of the dirt resulting in part from the direction in which the brushes 31 rotate, and in part from the fact that the axes of the brushes are inclined rearwardly and inwardly with respect to the longitudinal center of the vehicle, as shown in Figure 2 of the drawings.

The driving means for the brushes 31 comprises the engine 2, the shafts 41, the beveled pinions 40, the shafts 38, the beveled pinions 42, the shafts 36, the beveled pinions 35, the shafts 34, the beveled pinions 33 and the shafts 32 of the brushes 31.

A shaft 43 extends longitudinally of the vehicle and is journaled for rotation in the housing 16. An arm 44 extends transversely of the vehicle at the front thereof, and is mounted to swing vertically on the shaft 43. A brush 45 is journaled on the outer end of the arm 44 and is adapted to collect dirt in the gutter and carry the dirt inwardly toward the longitudinal center of the machine, within the field of operation of one of the forward brushes 31. A shaft 46 extends transversely of the vehicle and is driven by the engine 2. The outer end of the shaft 46 is connected with the shaft 43 by beveled pinions 47. A sprocket chain 48 connects the shaft 43 with the brush 45.

The driving train for the brush 45 includes the engine 2, the shaft 46, the beveled pinions 47 and the chain 48. The brush 45, when viewed from the front of the machine, rotates in a counter clockwise direction, and tends to carry the dirt inwardly, as hereinbefore described.

Shafts 49 are mounted in the rear portions of the auxiliary frame 27. Links 50 are mounted to swing vertically on the shafts 49, the forward ends of the links carrying the axles of rotary rear brushes 51, disposed parallel to the forward brushes 31, and mounted to rotate in a counter clockwise direction, so as to sweep the dirt forwardly toward the longitudinal center of the vehicle. The rear brushes 51 preferably are made up of a number of units, spaced apart as shown in Figure 2. Sprocket chains 52 connect the axles of the rear brushes 51 with the shafts 49. The inner ends of the shafts 49 are connected by beveled pinions 53 with shafts 54 journaled on the auxiliary frame 27, the forward ends of the shafts 54 being connected by beveled pinions 55 with the rear ends of the shafts 34.

It has been pointed out hereinbefore how the shafts 34 are rotated from the engine 2. When the shafts 34 are rotated, as aforesaid, the beveled pinions 55 will transmit motion from the shaft 34 to the shafts 54, the shaft 54, through the instrumentality of the beveled pinions 53, imparting rotation to the shafts 49, the sprocket chains 52 rotating the brushes 51.

Figures 4, 5, 6, 7:
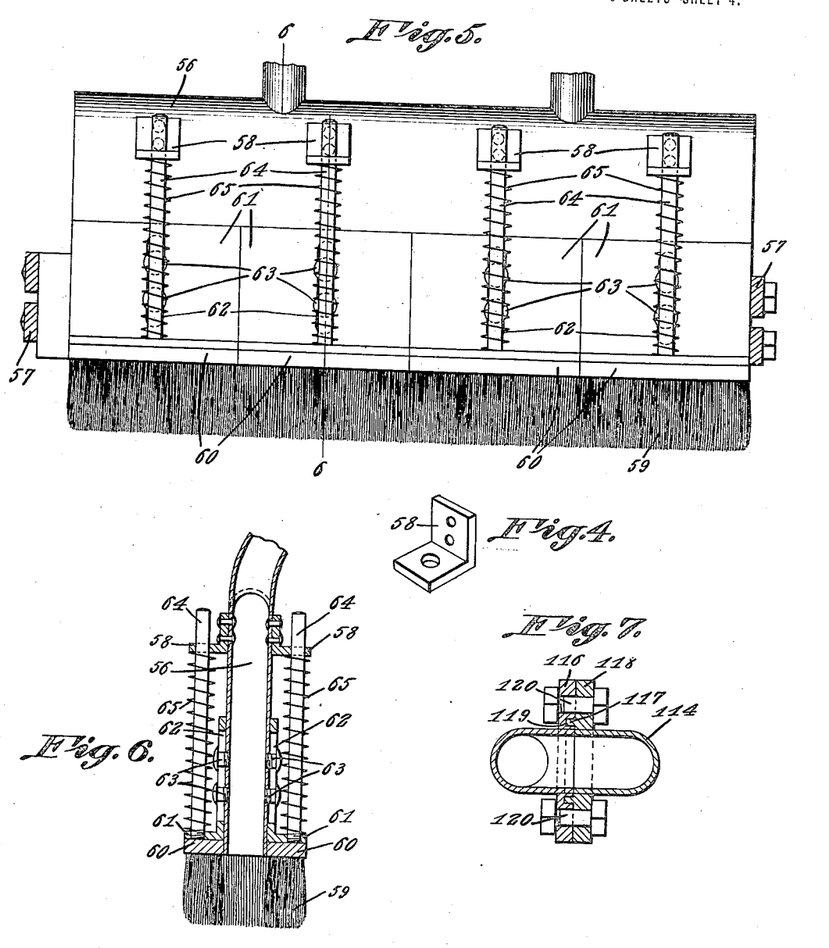
Figure 4 is a perspective view showing one of the brackets.
Figure 5 is an elevation showing one of the brushes and attendant parts.
Figure 6 is a section on the line 6—6 of Figure 5.
Figure 7 is a sectional detail illustrating one of the pipe couplings.

Located to the rear of the brushes 51 and disposed parallel thereto are suction heads 56, connected by links 57 to the auxiliary frame 27 for vertical swinging movement. As shown in Figure 5, the suction heads 56 are provided with upper brackets 58. Brushes 59 are supplied, the same including heads 60 carrying angle members 61. The vertical flanges of the angle members 61 slide in contact with the sides of the suction heads 56 and are provided with vertically elongated slots 62, receiving securing elements 63 carried by the suction heads, the construction being such that the brushes 59 may move vertically on the suction heads. The horizontal flanges of the angle members 61 carry rods 64 mounted to reciprocate in the upper brackets 58. Compression springs 65 surround the rods 64, the lower ends of the springs bearing against the horizontal portions of the angle members 61, and the upper ends of the springs bearing against the upper brackets 58.

It will be clear that the brushes 59 can reciprocate vertically, to cooperate with irregularities in the surface of the roadway, the springs 65 constituting means for maintaining the brushes depressed. When the brushes move upwardly or downwardly, the rods 54 slide in the upper brackets 58, the angle members 61 sliding on the suction heads 56, since these parts are connected by the securing elements 63 which are movable in the slots 62 of the members 61.

Figure 8:
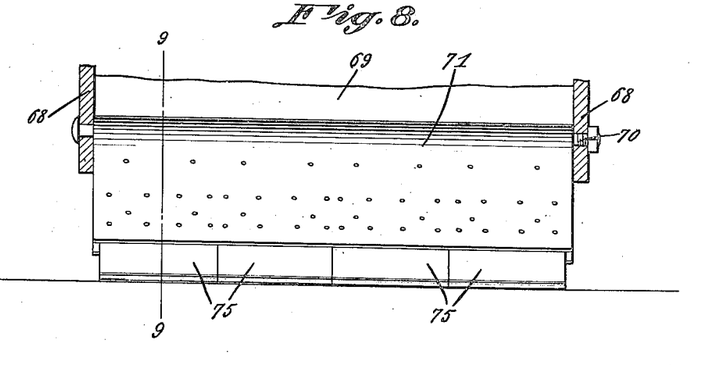
Figure 8 is an elevation showing the rear scraper, parts appearing in section.
Figure 9:
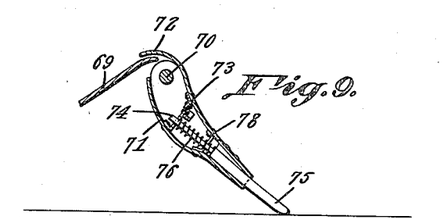
Figure 9 is a section on the line 9—9 of Figure 8.

Guides 77 are carried by the rear end of the main frame 1, and in these guides, a rearwardly inclined chute 67 is longitudinally adjustable, through the instrumentality of a mechanism which will be described hereinafter. Referring to Figure 8, it will be noted that the chute 67 includes side portions 68 and a bottom 69. A support 70, in the form of a rod, connects the side portions 68 of the chute 67. A casing 71 is mounting for swinging movement on the support 70, between the side portions 68 of the chute 67, the casing including a rearwardly extended lip 72 shown in Figure 9, the lip overhanging the forward end of the bottom 69 of the chute. Guides 73 are located within the casing 71 and receive slidably, the stems 74 of scrapers 75. Compression springs 76 are interposed between the rear ends of the scrapers 75 and the guides 73, as shown in Figure 9. The forward and rear portions of the casing 71 may be connected by braces 78. The springs 76 advance the scrapers 75 and cause the same to follow the surface of the roadway, the material collected travelling upwardly along the scrapers 75, and along the forward portions of the casing 71, the material passing over the lip 72 to the lower end of the chute 67.

A brush 79 is journaled for rotation in the side portions 68 of the chute portion 67 and is located in the median plane of the machine, to the rear of the brushes 51. The shaft of the brush 79 is connected by a sprocket chain 80 to a transverse shaft journaled on the frame of the machine and connected by beveled pinions 81 to a longitudinal shaft 82 journaled on the machine frame, the forward end of the shaft 82 being connected by beveled pinions 83 to one of the shafts 41.

The engine 2 operates the said shaft 41, the beveled pinions 83 imparting rotation to the shaft 82, the shaft 82 and the beveled pinions 81 imparting rotation to the short transverse shaft which, in its turn, operates the chain 80 and rotates the brush 79, in a clockwise direction, so that the dirt is carried rearwardly onto the scraper 75, and from the scraper 75 into the lower end of the chute 67, as hereinbefore described.

A feed screw 84 is journaled for rotation in the chute 67 and extends longitudinally thereof. On the lower end of the feed screw 84 there is a worm wheel 85 meshing into a worm 86 on a transverse shaft 87 journaled in the side portions 68 of the chute 67. The shaft 87 is connected by a sprocket chain 88 with the shaft of the brush 79.

When the brush 79 is rotated, as hereinbefore described, the chain 88 is driven from the said brush, the chain imparting rotation to the shaft 87, the worm 86 and the worm wheel 85 operating the feed screw 84. The feed screw carries the material rearwardly and upwardly along the chute 67 and deposits the same in a tender, to be described hereinafter.

In the foregoing description, the auxiliary frame 27 has been alluded to in the singular number but it will be understood that there is such a frame at each side of the machine. A means is provided for raising and lowering the auxiliary frames 27 and with this end in view, a shaft 89 is disposed transversely of the main frame 1 and is journaled thereon as shown in Figure 2. The shaft 89 carries a worm wheel 90 cooperating with a worm 91 on the shaft 3. The worm 91 is loose on the shaft 3, but is adapted to be coupled thereto through the instrumentality of a clutch 100. A sprocket chain 92 connects the shaft 89 with a transverse shaft 93 journaled on the main frame 1 to the rear of the shaft 89. Chains 94 connect the end portions of the shaft 89 with the auxiliary frames 27 at the respective sides of the vehicle, chains 95 connecting the end portions of the shaft 93 with the said auxiliary frames. The auxiliary frames 27 are provided with projections 96 engaged beneath the links 57 which support the suction heads 56, so that when the auxiliary frames 27 are swung upwardly, the suction heads 56 and the brushes 59 will participate in the swinging movement. Similarly, the auxiliary frame 27 at one side of the machine is supplied with a projection 97 engaged beneath a portion of the arm 44, so that when the said auxiliary frame 27 is swung upwardly, the arm 44 will be swung upwardly also, thereby elevating the gutter brush 45.

When the worm 91 is coupled to the shaft 3 through the means of the clutch 100, and when the shaft 3 is rotated from the engine 2, the worm 91 rotates with the shaft 3 and motion is transmitted to the shaft 89 by way of the worm wheel 90. The chains 94 are wound on the ends of the shaft 89, motion being transmitted from the shaft 89 to the shaft 93 by the sprocket chain 92. When the shaft 93 is rotated, the chains 95 will be reeled on the shaft 93, the function of the chains 94 and 95 being, obviously, to swing the outer ends of the auxiliary frames 27 and the corresponding brushes 31 and 51, upwardly.

Short shafts 98 shown in Figure 2 are journaled in the side portions of the main frame 1 at the rear end thereof. The shafts 98 are provided at their inner ends with pinions 99, meshing into racks 101 carried by the chute 67. The outer ends of the shaft 98 is connected with the shaft 93 by sprocket chains 102.

When motion is transmitted to the transverse shaft 93, as hereinbefore described, the sprocket chains 102 transmit movement to the shafts 98, the pinions 99 meshing into the racks 101 on the chute 67. In this way, the chute 67 may be raised and lowered, the chute sliding in the guides 77. The construction and operation is such that the scraper 75 and the rotary brush 79 will be raised and lowered, along with the chute 67, simultaneously with the raising and lowering of the brushes 52 and 31 which are carried by the auxiliary side frames 27.

The rear portion of the housing 16 carries a suction head 108 provided with brush units 109. This structure is not described in detail, because it is constructed like the part shown in Figure 5 of the drawings, the suction head and its brushes being located underneath the tubular chute 67, near to the lower forward end thereof.

Disposed within the body 14 and extended transversely thereof is a combined suction and blast device, denoted by the numeral 103 and operated by any suitable means 104 from the engine 2. The casing of the suction and blast device 103 is supplied with forwardly presented funnel-shaped heads 105, adapted to draw in and receive any dust which is in front of the machine. From the suction heads 56, conduits 106 lead, the conduits merging into a conduit 107, discharging within the casing of the suction and blast device 103. From the suction head 108 conduits 110 lead, as indicated at 111, into the suction and blast device 103. From the casing of the suction and blast device 103 conduits 112, 114 and 115 lead to the lower end portion of the tubular chute 67, there being a group of the conduits 112, 114, and 115, at each side of the machine.

Taking the conduit 114 as typical, and referring to Figure 7, it will be understood that joints may be interposed in the conduits wherever necessary, in order to provide flexibility. Thus, in Figure 7, one part of the conduit 114 is provided with a flange 116, there being a flange 118 on the other part of the conduit, the flange 118 having a circular rib 117 received in the circular groove 119 formed in the flange 116. Securing elements are mounted in the flange 116 and connect the flanges 116 and 118, the openings in the flange 118, which receive the securing elements 120, being elongated, so that relative pivotal movement between the flanges 116 and 118, and consequently between the conduit parts, may take place.

The brushes 31 and 51, rotating, sweep the dirt forwardly and inwardly toward the longitudinal center of the machine, the dirt in the gutter being carried inwardly, by the brush 45. Any dirt which passes the rotary brushes 31 and 51 is gathered by the brushes 59 and is carried upwardly to the suction heads 56, as will be described hereinafter. The dirt, deposited adjacent to the longitudinal center of the vehicle, by the brushes 31 and 51 is passed rearwardly by the rotary brush 79 and moves upwardly along the scraper 75 into the lower end of the chute 67, the feed screw 84 carrying the dirt rearwardly. Any tailings are cared for by the brush 109.

The suction and blast device 103 draws in the dust in front of the vehicle through the heads 105. The dust from the suction heads 56, traversing the conduits 106 and 107, enters the casing of the suction and blast device 103. The dust from the rear brush 109—108 is carried by the conduits 110 into the casing of the suction and blast device 103. The dust, having been drawn into the suction and blast device 103 is carried rearwardly by the conduits 112, 114 and 115, to the chute 67.

The auxiliary or side frames 27 may be raised and lowered as hereinbefore described, the chute 67 being raised and lowered, longitudinally, as hereinbefore set forth.

Means is provided whereby the dirt delivered rearwardly in the chute 67 by the feed screw 84, may be taken care of.

Figure 12:
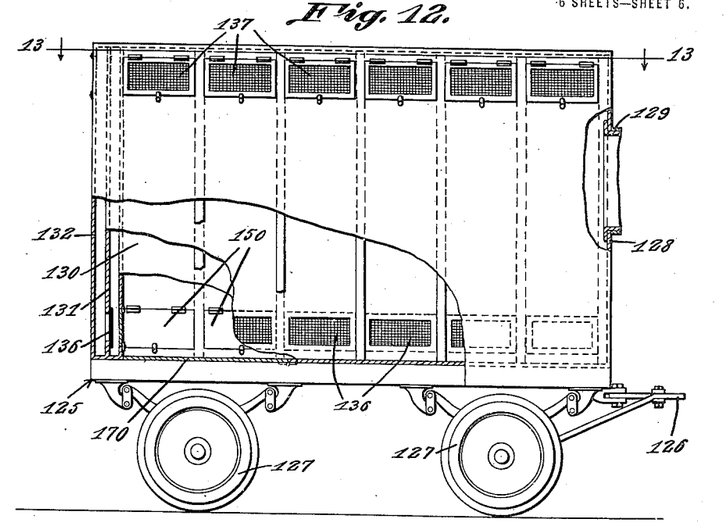
Figure 12 is a side elevation of the tender, parts being broken away.
Figures 13, 14:
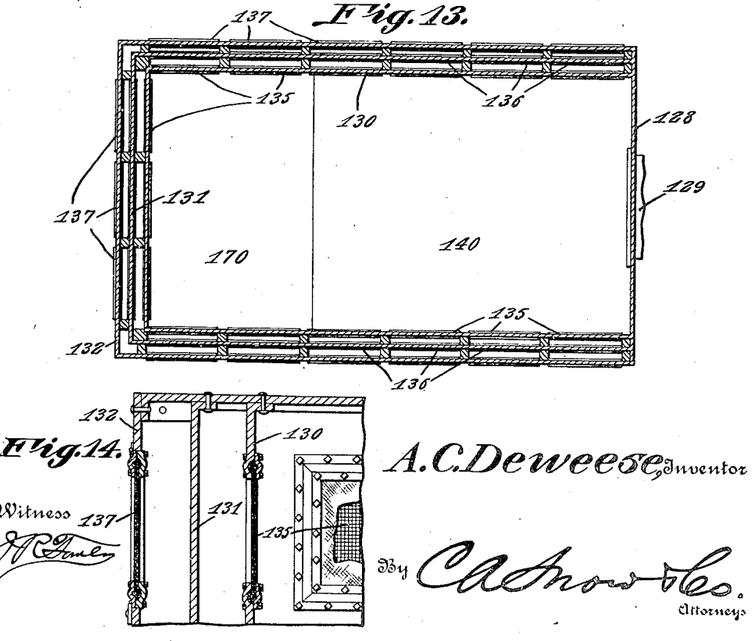
Figure 13 is a horizontal section of the tender.
Figure 14 is an enlarged detail relating to the outlet for the tender.

With the end last above described in view, a tender, denoted generally by the numeral 125, is connected by a draft rigging 126 of any desired construction, with the frame 1 of the sweeper. The tender 125 is carried by ground wheels 127 and includes a front wall 128, there being a flexible tubular connection 129 between the front wall 128 of the tender and the rear end of the upwardly inclined chute 67. The tender comprises an inner wall 130, an intermediate wall 131, and an outer wall 132. Screens 135 are mounted in the inner wall 130, near to the upper end thereof, screens 136 being located in the intermediate wall 131 near to the lower end thereof and screens 137 being located in the outer wall 132, near to the upper end thereof. The heavier material is deposited in the tender 125 on the bottom 140 thereof, the air passing through the screens 135, into the space between the walls 130 and 131, the air passing downwardly in said space, through the screens 136 in the intermediate wall 131, upwardly between the wall 131 and the wall 132, and outwardly through the screens 137, it being observed that, as shown in Figure 12, the screens 137 may be in the form of doors, if desired. Access may be had to the space between the inner wall 130 and the intermediate wall 131, by way of doors 150, normally closed and located in the inner wall 130 as shown best in Figure 12. In order that the heavier portions of the material deposited in the tender 125 may be removed, the bottom 140 may include a hinged section 170 located adjacent the rear of the tender, for the purpose specified. The various screens, such as the screen 135 may, if desired, be fashioned from wire netting covered by textile material of any desired sort.

The various brushes may be rotated at high, low or intermediate speeds, depending upon the nature of the material which is being handled, the surface of the ground and other conditions. The mechanism for driving the brushes may be independent of the means for propelling the vehicle.

Having thus described the invention, what is claimed is:—

1. In a device of the class described, a vehicle including a main frame; an auxiliary frame hinged to the main frame for raising and lowering; means for raising and lowering the auxiliary frame; a brush journaled for rotation in the auxiliary frame; means for rotating the brush; a fixed brush located to the rear of the first specified brush; means for connecting the fixed brush with the auxiliary frame for upward and downward swinging movement relative to the auxiliary frame; and means for applying suction to the fixed brush.

2. In a device of the class described, a vehicle including a main frame; an auxiliary frame pivoted to the main frame for raising and lowering; means for raising and lowering the auxiliary frame; a shaft mounted to rotate in the auxiliary frame; links carried by the shaft; a brush supported for rotation on the links; means for rotating the brush from the shaft; a fixed brush located to the rear of the first specified brush; means for applying suction to the fixed brush; and means for connecting the fixed brush with the auxiliary frame for upward and downward swinging movement relative to the auxiliary frame.

In testimony that I claim the foregoing as my own, I have hereto affixed my signature in the presence of two witnesses.

ALBERT C. DEWEESE.

Witnesses:
  IVY E. SIMPSON,
  MASON B. LAWTON.